US009756356B2

United States Patent
Yang et al.

(10) Patent No.: US 9,756,356 B2
(45) Date of Patent: Sep. 5, 2017

(54) APPLICATION-ASSISTED SPATIO-TEMPORAL ERROR CONCEALMENT FOR RTP VIDEO

(71) Applicants: Kyeong Ho Yang, Freehold, NJ (US); Myo Tun, Randolph, NJ (US); Ashwini Kumar, Bangalore (IN)

(72) Inventors: Kyeong Ho Yang, Freehold, NJ (US); Myo Tun, Randolph, NJ (US); Ashwini Kumar, Bangalore (IN)

(73) Assignee: Dialogic Corporation, Montreal (CA)

(*) Notice: Subject to any disclaimer, the term of this patent is extended or adjusted under 35 U.S.C. 154(b) by 446 days.

(21) Appl. No.: 14/307,860

(22) Filed: Jun. 18, 2014

(65) Prior Publication Data

US 2014/0376632 A1   Dec. 25, 2014

Related U.S. Application Data

(60) Provisional application No. 61/838,587, filed on Jun. 24, 2013.

(51) Int. Cl.
*H04N 19/513* (2014.01)
*H04N 19/895* (2014.01)

(52) U.S. Cl.
CPC ....... *H04N 19/521* (2014.11); *H04N 19/895* (2014.11)

(58) Field of Classification Search
CPC ... H04N 19/521; H04N 19/895; H03M 13/35; H03M 13/33; H03M 13/45; H04L 1/004
See application file for complete search history.

(56) References Cited

U.S. PATENT DOCUMENTS

| | | | |
|---|---|---|---|
| 8,819,525 B1 * | 8/2014 | Holmer | H03M 13/33 714/775 |
| 2003/0099298 A1 * | 5/2003 | Rose | H04N 21/234 375/240.27 |

(Continued)

FOREIGN PATENT DOCUMENTS

CN   WO 2006048788 A1 *   5/2006   ........... H04N 19/51

OTHER PUBLICATIONS

Thomas Wiegand, et al., "Overview of the H.264/AVC Video Coding Standard", IEEE Transactions on Circuits and Systems for Video Technology, vol. 13, No. 7, Jul. 2003, pp. 560-576.

*Primary Examiner* — Jay Patel
*Assistant Examiner* — Marnie Matt
(74) *Attorney, Agent, or Firm* — BainwoodHuang (57) ABSTRACT

Systems and methods that employ an application-assisted approach to adaptive spatio-temporal error concealment in video decoders. The systems and methods employ a video receiver that can receive real-time video frames from a video transmitter over a wired and/or wireless network. The video receiver includes an end system configurable as an application for consuming the content of the real-time video frames. The end system application can determine whether each received real-time video frame is complete or incomplete, whether each received slice is complete or incomplete, and provide such information to the video decoder for use in avoiding errors while decoding the respective real-time video frames. The video decoder can determine whether any pixel blocks included in real-time video packets are properly decoded or missing, generate statistics regarding the coding mode of the respective pixel blocks, and use such further information while performing adaptive spatio-temporal error concealment on the respective pixel blocks.

11 Claims, 5 Drawing Sheets

(56) References Cited

U.S. PATENT DOCUMENTS

| | | | | |
|---|---|---|---|---|
| 2004/0139462 A1* | 7/2004 | Hannuksela | H04N 19/895 | 725/32 |
| 2005/0169312 A1* | 8/2005 | Cakareski | H04L 29/06 | 370/473 |
| 2006/0130104 A1* | 6/2006 | Budagavi | H04N 21/2402 | 725/105 |
| 2006/0282737 A1* | 12/2006 | Shi | H03M 13/2966 | 714/746 |
| 2007/0033494 A1* | 2/2007 | Wenger | H04N 19/147 | 714/776 |
| 2007/0086523 A1* | 4/2007 | Yan | H04N 19/50 | 375/240.13 |
| 2007/0153898 A1* | 7/2007 | Yim | H04N 19/895 | 375/240.16 |
| 2007/0177678 A1* | 8/2007 | Subramania | H04N 19/176 | 375/240.27 |
| 2009/0060056 A1* | 3/2009 | Zhang | H04N 19/51 | 375/240.27 |
| 2009/0213940 A1* | 8/2009 | Steinbach | H04N 19/176 | 375/240.27 |
| 2010/0023837 A1* | 1/2010 | Nakagawa | H03M 13/35 | 714/752 |
| 2010/0027618 A1* | 2/2010 | Ozawa | H04L 1/0009 | 375/240.01 |
| 2010/0027679 A1* | 2/2010 | Sunahara | H04N 21/2381 | 375/240.24 |
| 2010/0150232 A1* | 6/2010 | Nguyen | H04N 21/2389 | 375/240.12 |
| 2010/0275105 A1* | 10/2010 | Ouedraogo | H04N 19/176 | 714/776 |
| 2011/0188766 A1* | 8/2011 | Nassor | H04N 7/327 | 382/233 |
| 2012/0079329 A1* | 3/2012 | Steinbach | H04N 19/176 | 714/704 |
| 2013/0039410 A1* | 2/2013 | Tan | H03M 13/05 | 375/240.02 |
| 2013/0279606 A1* | 10/2013 | Vanam | H04N 19/00854 | 375/240.27 |

* cited by examiner

APPLICATION-ASSISTED
SPATIO-TEMPORAL ERROR
CONCEALMENT FOR RTP VIDEO

CROSS REFERENCE TO RELATED
APPLICATIONS

This application claims benefit of the priority of U.S. Provisional Patent Application No. 61/838,587 filed Jun. 24, 2013 entitled APPLICATION-ASSISTED SPATIO-TEMPORAL ERROR CONCEALMENT FOR RTP VIDEO.

TECHNICAL FIELD

The present application relates generally to systems and methods of performing error concealment in video decoders, and more specifically to systems and methods that employ an application-assisted approach to adaptive spatio-temporal error concealment in video decoders.

BACKGROUND

In recent years, multimedia communications over wired and/or wireless packet communications networks such as the Internet have gained increased popularity. For example, such multimedia communications can be performed within the context of video conferencing systems. In such video conferencing systems, successful transmissions of multimedia data among groups of conference participant devices over packet communications networks generally require sufficient bandwidth and low latency for minimal packet loss. Such transmissions of multimedia data between the respective conference participant devices are typically based upon the real-time transport protocol (RTP), while delivery of such multimedia data to the respective conference participant devices is typically monitored using the real-time transport control protocol (RTCP).

Maintaining successful multimedia communications in such video conferencing systems can be problematic, however, particularly when transmissions of multimedia data are performed over packet communications networks such as the Internet. For example, while engaging in video conferencing over the Internet, groups of conference participant devices may be subjected to different levels of network congestion, which can result in reduced bandwidth, increased latency, and ultimately increased packet losses, potentially degrading the multimedia quality of experience (QoE) for one, some, or all of the respective conference participant devices in the respective groups.

To address the problem of increased packet losses associated with transmissions of multimedia data over packet communications networks, various error concealment techniques, such as temporal (e.g., inter-frame) and spatial (e.g., intraframe) error concealment techniques, have been employed, using information obtained from the multimedia bitstream. Such error concealment techniques can be used to interpolate areas of video frames that have been adversely affected by such packet losses. It would be desirable, however, to have improved systems and methods of error concealment that can maintain desired multimedia QoE levels while engaging in real-time video communications over lossy networks, such as wired and/or wireless packet communications networks including the Internet.

SUMMARY

In accordance with the present application, systems and methods are disclosed that employ an application-assisted approach to adaptive spatio-temporal error concealment in video decoders. In the disclosed systems and methods, an end system application at a video receiver can determine whether each of a plurality of received video frames is complete or incomplete, and provide information pertaining to such complete or incomplete video frames to a video decoder for use in avoiding errors while decoding the respective video frames. The video decoder can determine whether any picture element (also referred to herein as "pixel") blocks in the received video packets are properly decoded, improperly decoded, or missing, generate statistics regarding at least a coding mode of the respective pixel blocks, and use such information pertaining to the respective pixel blocks while performing the adaptive spatio-temporal mode of error concealment on the respective video frames.

In one aspect, a system for application-assisted error concealment in real-time communications includes a video transmitter and a video receiver, which, in turn, includes an end system application and a video decoder. The video transmitter is operative to send a plurality of real-time video frames over a packet communications network. Each real-time video frame includes a plurality of slices, in which each slice includes a plurality of real-time video packets, and each real-time video packet includes information about a plurality of pixel blocks. The video receiver is operative to receive the plurality of real-time video frames sent over the packet communications network. The end system application is operative to obtain first predetermined information as to whether each of at least some of the real-time video frames is complete or incomplete, whether at least one of the real-time video packets is missing, and, in the event at least one real-time video packet is missing, whether at least one of the real-time video packets remaining in the respective real-time video frame requires information from the missing real-time video packet for proper decoding. The video decoder is operative to decode the respective real-time video frames using at least the first predetermined information obtained by the end system application, and to obtain second predetermined information as to whether each of at least some of the pixel blocks are properly decoded, improperly decoded, or missing. The second predetermined information includes statistics regarding at least a coding mode for each respective pixel block. The video decoder includes an application-assisted error concealment component, which is operative to perform at least one predetermined mode of error concealment on the respective pixel blocks, using at least the second predetermined information obtained by the video decoder.

In one mode of operation, a plurality of real-time video frames are received at the video receiver over the packet communications network. The first predetermined information is obtained by the end system application, such first predetermined information including information as to whether each of at least some of the real-time video frames is complete or incomplete, whether at least one of the real-time video packets is missing, and, in the event at least one real-time video packet is missing, whether at least one of the real-time video packets remaining in the respective real-time video frame requires information from the missing real-time video packet for proper decoding. The respective real-time video frames are decoded by the video decoder, using at least the first predetermined information obtained by the end system application. The second predetermined information is obtained by the video decoder, such second predetermined information including information as to whether each of at least some of the pixel blocks are properly decoded, improperly decoded, or missing. The second predetermined information includes statistics regarding at least the coding mode for each respective pixel block. At least one predetermined mode of error concealment is performed by the application-assisted error concealment component on the respective pixel blocks, using at least the second predetermined information obtained by the video decoder.

By employing an application-assisted approach to adaptive spatio-temporal error concealment in video decoders, the disclosed systems and methods can beneficially improve a user's quality of experience (QoE) while engaging in real-time video communications over lossy networks, such as wireless and/or wired networks including the Internet.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings.

DETAILED DESCRIPTION

The disclosure of U.S. Provisional Patent Application No. 61/838,587 filed Jun. 24, 2013 entitled APPLICATION-ASSISTED SPATIO-TEMPORAL ERROR CONCEALMENT FOR RTP VIDEO is hereby incorporated herein by reference in its entirety.

Systems and methods are disclosed that employ an application-assisted approach to adaptive spatio-temporal error concealment in video decoders. The disclosed systems and methods employ a video receiver that can receive video packets from a video transmitter over a wired and/or wireless packet communications network such as the Internet. The video transmitter can be an end system configurable as an application for generating content to be sent over the network as real-time video packets, and the video receiver can be another end system configurable as an application for consuming the content of the real-time video packets received over the network. Sets of such real-time video packets received over the network at the video receiver can form a plurality of video frames.

The end system application at the video receiver can determine whether each received video frame is complete or incomplete, and provide such information to a video decoder for use in avoiding errors while decoding the respective video frames. The video decoder can determine whether any pixel blocks in the received video packets are properly decoded, improperly decoded, or missing, generate statistics regarding at least a coding mode of the respective pixel blocks, and use such information pertaining to the respective pixel blocks while performing an adaptive spatio-temporal mode of error concealment. By employing an application-assisted approach to adaptive spatio-temporal error concealment in video decoders, the disclosed systems and methods can beneficially improve a user's quality of experience (QoE) while engaging in real-time video communications over lossy networks, such as wireless and/or wired networks including the Internet.

Figure 1:
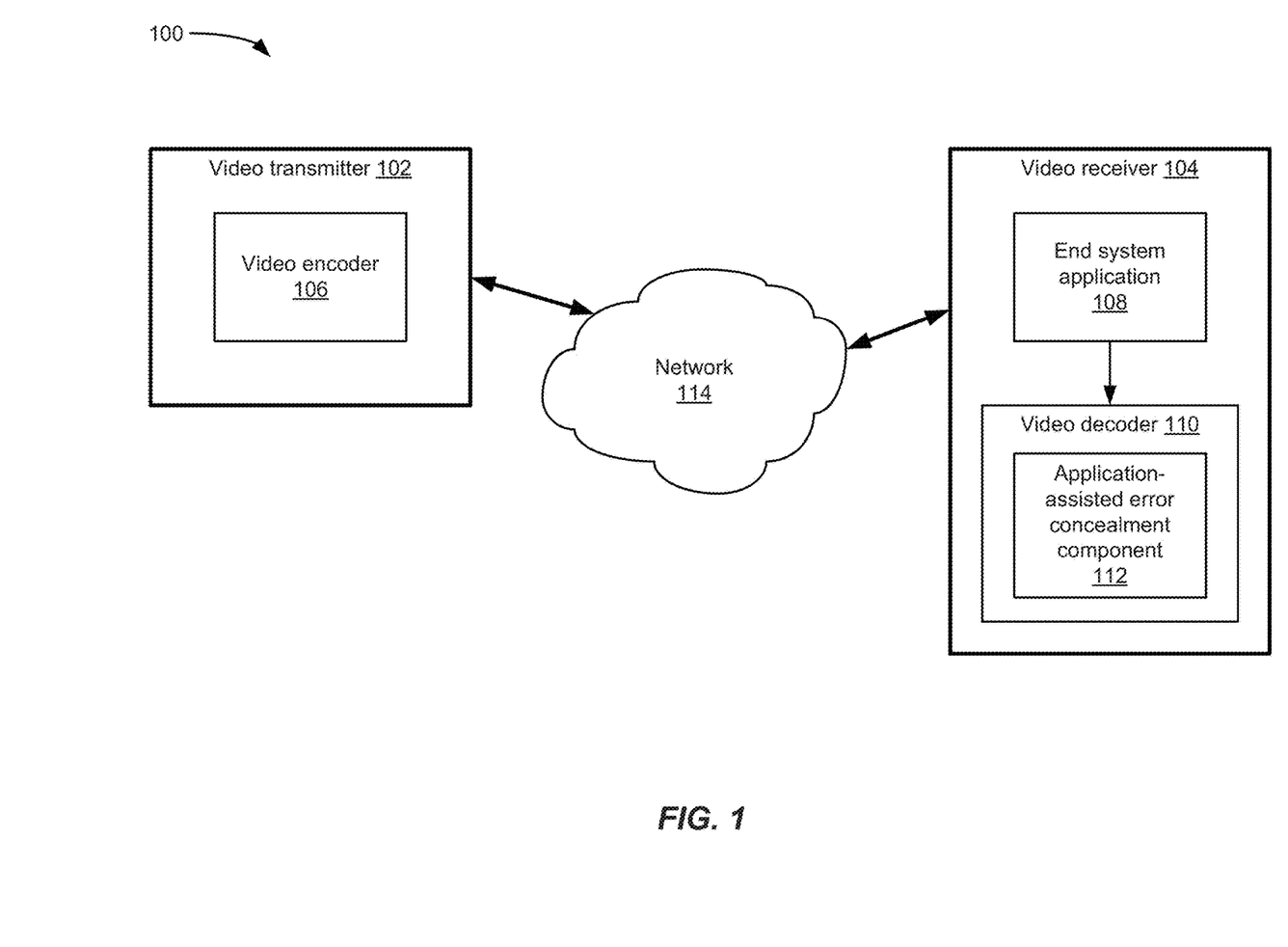
FIG. 1 is a block diagram of an exemplary real-time video communications system that includes an exemplary video transmitter and an exemplary video receiver, in which the video receiver includes an exemplary video decoder having an exemplary application-assisted error concealment component, in accordance with the present application.

FIG. 1 depicts an illustrative embodiment of an exemplary real-time video communications system 100 that includes an exemplary video transmitter 102 and an exemplary video receiver 104, which includes an end system application 108, as well as a video decoder 110 having an application-assisted error concealment component 112, in accordance with the present application. The video receiver 104 is operative to receive video packets from the video transmitter 102 over a network 114, such as the Internet or any other suitable wired and/or wireless network. For example, the video transmitter 102 can be configured to send such video packets over the network 114 in conformance with RFC 3550—*RTP: A Transport Protocol for Real-Time Applications*, July 2003 (or latest revision), RFC 3984—*RTP Payload Format for H.264 Video*, February 2005 (or latest revision), or any other suitable real-time protocol. Further, sets of such video packets (also referred to herein as "RTP video packets") sent by the video transmitter 102 over the network 114 can form a plurality of video frames, each of which can conform to the H.264 Advanced Video Coding (AVC) video format (also referred to herein as the "H.264 video format"), the ISO/IEC 23008-2 and ITU-T Recommendation H.265 video format (also referred to as the "high efficiency video coding standard" or "HEVC video format"), or any other suitable video format.

As shown in FIG. 1, the video transmitter 102 includes a video encoder 106. In an exemplary embodiment, the video encoder 106 can be configured to encode, using any suitable block transformation technique, multiple YUV (one luma (Y), two chrominance (UV)) video frames to obtain a plurality of transform blocks (e.g., 4×4 or 8×8 transform blocks) containing transformation coefficient values for the respective video frames. For example, in accordance with the H.264 video format, a respective video frame can be split into blocks of 16×16 pixels (such blocks of pixels also referred to herein as "macroblocks" or MBs), and each such macroblock (MB) can be further split into multiple blocks, which, in turn, can undergo block transformation to obtain the plurality of transform blocks containing the transformation coefficient values for the respective video frames.

With reference to FIG. 1, the video transmitter 102 can be an end system configurable as an application for generating the content of the real-time transport protocol (RTP) video packets to be sent over the network 114. The video receiver 104 can also be an end system configurable as an application (e.g., the end system application 108) for consuming the content of the RTP video packets received over the network 114. The end system application 108 is operative to determine (1) whether each received video frame is complete or incomplete, (2) whether any RTP video packets in the respective video frame are lost or missing, and (3) if one or more RTP video packets in the respective video frame are determined to be lost or missing, whether any remaining RTP video packets in the respective video frame require information from one or more of the missing RTP video packets for proper decoding. The end system application 108 is further operative to provide such information pertaining to the video frames and RTP video packets to the video decoder 110, for use in avoiding errors while decoding the respective video frames.

The video decoder 110 is operative (1) to determine whether any pixel blocks in the received RTP video packets are properly decoded, improperly decoded, or missing, (2) to generate statistics regarding at least the coding mode (e.g., inter-coded, intra-coded) of the respective pixel blocks, and (3) to provide such information pertaining to the pixel blocks to the application-assisted error concealment component 112, for use in performing error concealment in a real-time video communication. It is noted that a respective MB whose coding mode is "inter-coded" is referred to herein as an inter-coded MB, and that a respective MB whose coding mode is "intra-coded" is referred to herein as an intra-coded MB.

The operation of the end system application 108 and the video decoder 110 included in the video receiver 104 will be further understood with reference to the following illustrative example, as well as FIGS. 1, 2a-2c, 3a, and 3b. As described herein, sets of RTP video packets sent by the video transmitter 102 over the network 114 can form a plurality of video frames conforming to a predetermined video format, such as the H.264 video format. Such video frames can each include a plurality of network abstraction layer (NAL) units (each such NAL unit also referred to herein as a/the "slice"), each of which can, in turn, include a plurality of RTP video packets.

Figure 2A:
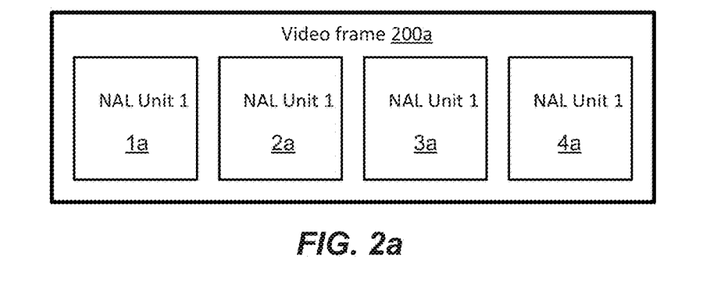
FIG. 2a is a diagram of an exemplary video frame including a plurality of exemplary network abstraction layer (NAL) units.
Figure 2B:
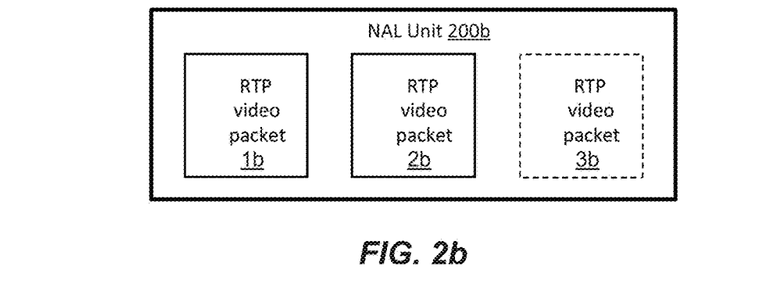
FIGS. 2b and 2c are diagrams of exemplary NAL units, each including a plurality of exemplary real-time transport protocol (RTP) video packets.
Figure 2C:
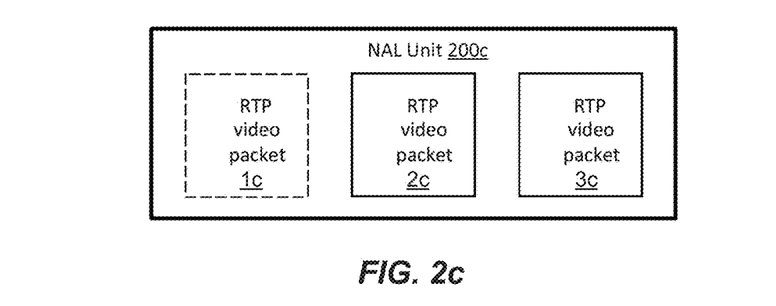

FIG. 2a depicts an exemplary video frame 200a that can include a plurality of NAL units, such as four NAL units 1a, 2a, 3a, and 4a, or any other suitable number of NAL units. FIG. 2b depicts an exemplary NAL unit 200b that can include a plurality of RTP video packets, such as three RTP video packets 1b, 2b, and 3b, or any other suitable number of RTP video packets. FIG. 2c depicts an exemplary NAL unit 200c that can also include a plurality of RTP video packets, such as three RTP video packets 1c, 2c, and 3c, or any other suitable number of RTP video packets.

Upon receipt of the video frame 200a at the video receiver 104, the end system application 108 determines whether the received video frame 200a is complete or incomplete, specifically, whether each respective NAL unit 1a, 2a, 3a, 4a in the video frame 200a is complete or incomplete. For example, with reference to the exemplary NAL unit 200b, the end system application 108 can determine (1) whether or not any of the RTP video packets 1b, 2b, 3b in the NAL unit 200b are missing, and (2) if one or more of the RTP video packets 1b, 2b, 3b in the NAL unit 200b are determined to be missing, whether any remaining RTP video packets in the NAL unit 200b require information from one or more of the missing RTP video packets 1b, 2b, and/or 3b for proper decoding. Likewise, with reference to the exemplary NAL unit 200c, the end system application 108 can determine (1) whether or not any of the RTP video packets 1c, 2c, 3c in the NAL unit 200c are missing, and (2) if one or more of the RTP video packets 1c, 2c, 3c in the NAL unit 200c are determined to be missing, whether any remaining RTP video packets in the NAL unit 200c require information from one or more of the missing RTP video packets 1c, 2c, and/or 3c for proper decoding.

In this illustrative example, the end system application 108 at the video receiver 104 can determine that the RTP video packet 3b in the NAL unit 200b (see FIG. 2b) is missing (i.e., the NAL unit 200b is incomplete), and further determine that none of the remaining RTP video packets 1b, 2b in the NAL unit 200b require information from the missing RTP video packet 3b for proper decoding. The end system application 108 can also determine that the RTP video packet 1c in the NAL unit 200c (see FIG. 2c) is missing (i.e., the NAL unit 200c is incomplete), and further determine that one or more of the remaining RTP video packets 2c, 3c in the NAL unit 200c require information from the missing RTP video packet 1c for proper decoding.

To assure that the video decoder 110 does not generate one or more errors while attempting to decode an incomplete NAL unit, such as the NAL unit 200b or 200c, the end system application 108 at the video receiver 104 provides the video decoder 110 with information indicative of whether or not the incomplete NAL unit 200b or 200c can be at least partially decoded, thereby improving a user's QoE. For example, the end system application 108 can provide the video decoder 110 with information indicating that (1) the RTP video packet 3b from the NAL unit 200b is missing, and, (2) because none of the remaining RTP video packets 1b, 2b in the NAL unit 200b require information from the missing RTP video packet 3b for proper decoding, the NAL unit 200b can be at least partially decoded. Likewise, the end system application 108 can provide the video decoder 110 with information indicating that (1) the RTP video packet 1c from the NAL unit 200c is missing, and, (2) because one or more of the remaining RTP video packets 2c, 3c in the NAL unit 200b require information from the missing RTP video packet 1c for proper decoding, it might not be possible to at least partially decode the NAL unit 200c.

Having received such information pertaining to an incomplete NAL unit (such as the incomplete NAL unit 200b or 200c), the video decoder 110 can begin parsing and decoding the incomplete NAL unit, but discontinue such parsing/decoding of the incomplete NAL unit before reaching the end of a respective RTP video packet in the NAL unit, taking into account a predetermined amount of offset. For example, such a predetermined amount of offset can be about 50 bits, or any other suitable number of bits. Further, the video decoder 110 can check the current decoding location in the respective RTP video packet at the start of each macroblock, as well as at each 8×8 transform block level. It is noted that a buffer within the video decoder 110 for a video bitstream including the respective video frames can be padded with any suitable number of bits (e.g., 256 bits) to avoid invalid memory accesses, in the event the video decoder 110 does not discontinue parsing/decoding an incomplete NAL unit sufficiently prior to reaching the end of an RTP video packet within the incomplete NAL unit.

In this illustrative example, the video receiver 104 can operate on an exemplary video frame, as follows. First, the end system application 108 within the video receiver 104 receives a plurality of RTP video packets sent by the video transmitter 102 over the network 114, and then attempts to form one or more NAL units from the received RTP video packets. While attempting to form a respective NAL unit, the end system application 108 determines whether each NAL unit (or slice) is complete or incomplete, and sets a flag for each NAL unit (or slice) that is determined to be incomplete. Once the respective NAL units are formed, the end system application 108 forms the exemplary video frame from the respective NAL units, and provides the video frame to the video decoder 110, which begins parsing/decoding the RTP video packets in the video frame slice-by-slice. In the event the video decoder 110 determines, from the flag set for a respective NAL unit, that the respective NAL unit is incomplete, the video decoder 110 checks the current decoding location in the respective NAL unit at the start of each macroblock and at each 8×8 transform block level, taking into account the predetermined amount of offset (e.g., 50 bits), and discontinues parsing/decoding the respective NAL unit before reaching the end of the NAL unit.

While parsing/decoding the RTP video packets in the exemplary video frame, the video decoder 110 can collect, determine, or otherwise obtain at least the following information for subsequent use in performing the disclosed adaptive spatio-temporal mode of error concealment:
  information pertaining to each flagged NAL unit (or slice) that is determined to be incomplete,
  information indicating whether a respective MB included in the video frame is properly decoded, improperly decoded, and/or missing (the video decoder 110 can subsequently use such information pertaining to the MBs included in the video frame to create what is referred to herein as a "missing MB map"), and
  statistics for inter-coded MBs, including the following:
    a cost value, $Cost_{SAD}$, indicative of an approximate sum of absolute difference (SAD) value for each inter-coded MB, and
    the total number of inter-coded MBs.

For example, the cost value, $Cost_{SAD}$, can be expressed, as follows:

$$Cost_{SAD} = \lambda(QP) * (\text{number of bits consumed for the decoding coefficients}) \quad (1)$$

in which "QP" is a predetermined quantization parameter, and "λ( . . . )" is a predetermined function of the QP. The video decoder 110 can then provide the obtained information to the application-assisted error concealment component 112.

In the event the information provided by the video decoder 110 to the application-assisted error concealment component 112 indicates that a respective MB in the exemplary video frame is missing, the application-assisted error concealment component 112 can perform the adaptive spatio-temporal mode of error concealment, as follows. First, using at least some of the information pertaining to the statistics for inter-coded MBs (i.e., $Cost_{SAD}$, total number of inter-coded MBs), the application-assisted error concealment component 112 calculates, determines, or otherwise obtains an adaptive SAD threshold value, $Thr_{adaptive}$, which can be expressed, as follows:

$$Thr_{adaptive} = 4 * (\text{total SAD value for inter-coded MBs}) / (\text{total number of inter-coded MBs}) \quad (2)$$

It is noted that the adaptive SAD threshold value, $Thr_{adaptive}$, can be bounded by a predetermined minimum value (e.g., 2,000 or any other suitable value), as well as a predetermined maximum value (e.g., 10,000 or any other suitable value), for more robust processing.

If the SAD value for the respective MB is determined to be less than the adaptive SAD threshold value, $Thr_{adaptive}$, then the application-assisted error concealment component 112 can perform temporal error concealment on the exemplary video frame. Otherwise, if the SAD value for the respective MB is determined to be greater than or equal to the adaptive SAD threshold value, $Thr_{adaptive}$, then the application-assisted error concealment component 112 can perform spatial error concealment on the exemplary video frame. The application-assisted error concealment component 112 can also perform spatial error concealment if it is determined that the exemplary video frame corresponds to a scene change frame.

It is noted that temporal (e.g., interframe) error concealment is generally used to estimate missing motion vectors, which, in turn, can be used for motion compensated temporal replacement of missing MBs. It is further noted that spatial (e.g., intraframe) error concealment generally relies upon spatially adjacent MBs for estimating missing pixels, typically through an interpolation process.

Next, the application-assisted error concealment component 112 attempts to identify (e.g., using a missing MB map) at least one contiguous chunk of MBs in the exemplary video frame in which all of the MBs are either properly decoded or missing, and determines whether any such identified chunk includes more than about 50% of the MBs included in the video frame. As described herein, such a missing MB map can be created, generated, or otherwise obtained by the video decoder 110 using the information pertaining to properly decoded, improperly decoded, and/or missing MBs in the exemplary video frame.

Figure 3A:
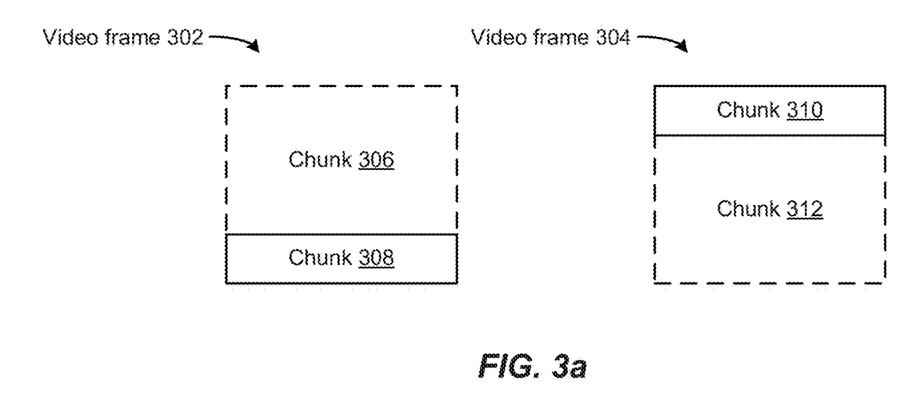
FIG. 3a illustrates diagrams of exemplary video frames, each video frame having an exemplary contiguous missing chunk containing more than about 50% of the macroblocks (MBs) from the respective video frame.

FIG. 3a depicts a plurality of exemplary video frames 302, 304, each of which has a contiguous missing chunk of MBs with more than about 50% of the MBs from the respective video frame. As shown in FIG. 3a, the video frame 302 includes two contiguous chunks 306 and 308, in which the contiguous chunk 306 is determined to be missing, and the next contiguous chunk 308 is determined to be properly decoded. As graphically illustrated in FIG. 3a, the contiguous chunk 306 includes more than about 50% of the MBs included in the video frame 302. As further shown in FIG. 3a, the video frame 304 also includes two contiguous chunks 310 and 312, in which the contiguous chunk 310 is determined to be properly decoded, and the next contiguous chunk 312 is determined to be missing. As graphically illustrated in FIG. 3a, the contiguous chunk 312 includes more than about 50% of the MBs included in the video frame 304. For such video frames having relatively large chunks that are determined to be missing, the application-assisted error concealment component 112 can perform temporal error concealment on the respective video frames, such as the zero motion vector (MV)-based temporal mode of error concealment, or any other suitable mode of error concealment.

Figure 3B:
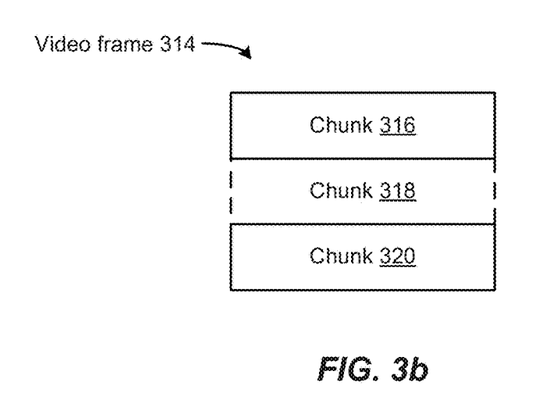
FIG. 3b is a diagram of an exemplary video frame having an exemplary contiguous missing chunk containing less than about 50% of the MBs from the respective video frame.

FIG. 3b depicts an exemplary video frame 314 that includes a contiguous chunk 318 of MBs having less than about 50% of the MBs in the respective video frame 314. As shown in FIG. 3b, the video frame 314 includes three contiguous chunks, namely, a contiguous chunk 316, the contiguous chunk 318, and a contiguous chunk 320. For example, each contiguous chunk 316, 318, 320 can include 10 MBs, or any other suitable number of MBs. As noted herein, the contiguous chunk 318 is determined to be missing. Because the contiguous chunk 318 includes 10 MBs, or about 33% (i.e., less than 50%) of the MBs included in the video frame 314, the application-assisted error concealment component 112 can preferably perform the disclosed adaptive spatio-temporal mode of error concealment on the respective video frame.

In this illustrative example, the application-assisted error concealment component 112 can perform adaptive spatio-temporal error concealment on the exemplary video frame, as follows. First, the application-assisted error concealment component 112 creates, generates, or otherwise obtains a list of MBs (e.g., improperly decoded MBs, missing MBs) that are eligible for error concealment, ranging from such eligible MBs that have the highest number of properly decoded neighboring MBs, to such eligible MBs that have the lowest number of properly decoded neighboring MBs. The application-assisted error concealment component 112 then attempts to perform a suitable mode of error concealment on the eligible MBs that have the highest number of properly decoded neighboring MBs first, followed by the eligible MBs that have the lowest number of properly decoded neighboring MBs, thereby reducing the possibility of error propagation during the error concealment process.

For each MB in the list of eligible MBs, the application-assisted error concealment component 112 can collect, determine, or otherwise obtain at least the following information pertaining to its neighboring MBs:
the availability of such neighboring MBs,
if at least one neighboring MB is determined to be available, the coding mode (e.g., inter-coded, intra-coded) of the neighboring MB, and
if the neighboring MB has already undergone error concealment, the mode of error concealment employed (e.g., such mode of error concealment can include the zero MV-based temporal mode of error concealment, the temporal mode of error concealment using spatial MV, the temporal mode of error concealment using block matching, and the spatial mode of error concealment).

Once such information pertaining to the neighboring MBs is obtained, the application-assisted error concealment component 112 evaluates the respective modes of error concealment (e.g., zero MV-based temporal error concealment, temporal error concealment using spatial MV, temporal error concealment using block matching, and spatial error concealment) for each respective MB in the list of eligible MBs.

For example, with regard to the zero MV-based temporal mode of error concealment, the application-assisted error concealment component 112 can calculate, determine, or otherwise obtain, for a respective MB, a boundary pixel error for such zero MV-based temporal error concealment. In the event the boundary pixel error is less than a predetermined threshold value, $Thr_{zero\_MV}$ (e.g., 2,000 or any other suitable value), the application-assisted error concealment component 112 can determine that the zero MV-based temporal mode of error concealment is the preferred error concealment mode to use for the respective MB. Otherwise, the application-assisted error concealment component 112 can determine, for the respective MB, whether a SAD value for temporal error concealment using spatial MV is less than the adaptive SAD threshold value, $Thr_{adaptive}$ (see equation (2)). In the event the SAD value for such temporal error concealment using spatial MV is determined to be less than the adaptive SAD threshold value, $Thr_{adaptive}$, the application-assisted error concealment component 112 can determine that the temporal error concealment mode using spatial MV is the preferred error concealment mode to use for the respective MB.

If neither the zero MV-based temporal mode of error concealment nor the temporal error concealment mode using spatial MV is determined to be the preferred error concealment mode for the respective MB, then the application-assisted error concealment component 112 can perform a block matching search for the preferred error concealment mode to use for the respective MB. For example, in the event a SAD value for temporal error concealment using block matching is less than the adaptive SAD threshold value, $Thr_{adaptive}$ (see equation (2)), the application-assisted error concealment component 112 can determine that the temporal error concealment mode using block matching is the preferred error concealment mode for the respective MB. Otherwise, if none of the zero MV-based temporal mode of error concealment, the temporal mode of error concealment using spatial MV, and the block matching temporal mode of error concealment is determined to be the preferred error concealment mode for the respective MB, then the application-assisted error concealment component 112 can perform a spatial mode of error concealment on the respective MB.

An exemplary method of performing adaptive spatio-temporal error concealment, which can be performed by the application-assisted error concealment component 112 (see FIG. 1), is described herein with reference to the following pseudo-code example:

```
Perform adaptive spatio-temporal error concealment
    create a list of MBs (e.g., improperly decoded MBs, missing MBs) eligible
    for error concealment
        for each MB in the list of eligible MBs
            check for availability of neighboring MBs
            if (boundary pixel error for zero MV-based temporal error
            concealment < Thr_zero_MV)
                perform zero MV-based temporal error concealment
            else if (SAD value for temporal error concealment using spatial MV
            < Thr_adaptive)
                perform temporal error concealment using spatial MV
            else if (SAD value for temporal error concealment using block
            matching < Thr_adaptive)
                perform temporal error concealment using block matching
            else
                perform spatial error concealment
```

In the event the temporal mode of error concealment using spatial MV is determined to be the preferred error concealment mode to use for a respective MB in the list of eligible MBs, and the respective MB is determined to be a missing MB, the application-assisted error concealment component 112 can assume that the MV for the respective MB is substantially same as the MV for one of its available neighboring MBs, so long as the available neighboring MB is an inter-coded MB. In the event the respective MB has more than one available inter-coded neighboring MB, the application-assisted error concealment component 112 can calculate, determine, or otherwise obtain, using at least the information pertaining to the statistics for the inter-coded MBs, a cost (such as the $Cost_{SAD}$; see equation (1)) associated with each such inter-coded neighboring MB, and select the inter-coded neighboring MB having the lowest associated cost for use in performing temporal error concealment using spatial MV on the respective MB. For example, such a cost associated with each such inter-coded neighboring MB can be calculated with full-pixel MV approximation and/or zero MV approximation.

In the event the temporal mode of error concealment using block matching is determined to be the preferred error concealment mode to use for a respective MB in the list of eligible MBs, the application-assisted error concealment component 112 can search for at least one available neighboring MB for the respective MB. Specifically, for the respective MB, the application-assisted error concealment component 112 can evaluate any inter-coded neighboring MBs that have been properly decoded, or have undergone temporal error concealment using spatial MV. Further, for each such inter-coded neighboring MB, the application-assisted error concealment component 112 can calculate, determine, or otherwise obtain, using at least the information pertaining to the statistics for the inter-coded neighboring MBs, a cost (such as the $Cost_{SAD}$; see equation (1)) associated with the inter-coded neighboring MB, and select the inter-coded neighboring MB having the lowest associated cost for use in performing temporal error concealment using block matching on the respective MB. For example, such a cost associated with each such inter-coded neighboring MB can be calculated with zero MV approximation. It is noted that any suitable motion vector refinement technique may also be employed to increase the accuracy of the motion vector (MV).

In the event the spatial mode of error concealment is determined to be the preferred error concealment mode to use for a respective MB in the list of eligible MBs, and the respective MB is determined to be a missing MB, the application-assisted error concealment component 112 can evaluate one or more neighboring MBs for possible use in performing spatial error concealment on the respective MB. Further, the application-assisted error concealment component 112 can apply weighting coefficients to various pixel values in the neighboring MBs, such that a maximum weight is applied to the pixel value in a respective neighboring MB that is closest to a corresponding pixel value in the missing MB.

In the event there are a plurality of neighboring MBs to be evaluated (such as the plurality of neighboring MBs immediately surrounding the missing MB), the application-assisted error concealment component 112 can perform any suitable edge detection technique to aid in selecting the neighboring MB for use in performing spatial error concealment on the respective MB. The application-assisted error concealment component 112 can perform such an edge detection technique to detect a vertical edge or a horizontal edge by comparing the mean values of selected sub-blocks included in the available neighboring MBs (e.g., 16×8 sub-blocks, 8×16 sub-blocks, and/or 8×8 sub-blocks in the neighboring MBs immediately surrounding the missing MB) located at boundaries of the respective MB. Based at least upon the comparison of the mean values of the respective sub-blocks, the application-assisted error concealment component 112 can determine whether a detected edge is a vertical edge or a horizontal edge.

For example, if the difference in mean values of the sub-blocks for the neighboring MBs relatively located to the left and the bottom-left of the respective MB is greater than the difference in mean values of the sub-blocks for the neighboring MBs relatively located to the bottom and the bottom-left of the respective MB, then the application-assisted error concealment component 112 can determine that the detected edge is a horizontal edge. Otherwise, the application-assisted error concealment component 112 can determine that the detected edge is a vertical edge. Further, in the event the detected edge is determined to be a horizontal edge, the application-assisted error concealment component 112 can select the neighboring MB relatively located to the left of the respective MB for use in spatial error concealment, in an effort to reduce the introduction of unwanted artifacts.

Figure 4A:
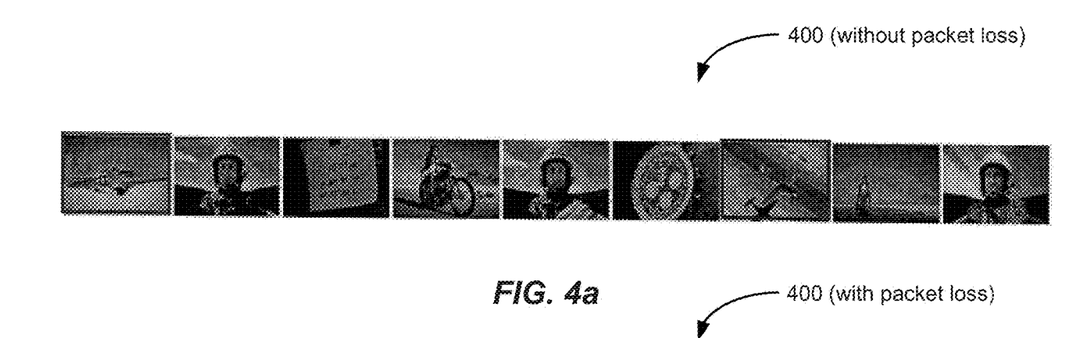
FIG. 4a illustrates exemplary video frames decoded from an exemplary video bitstream without packet loss.
Figure 4B:
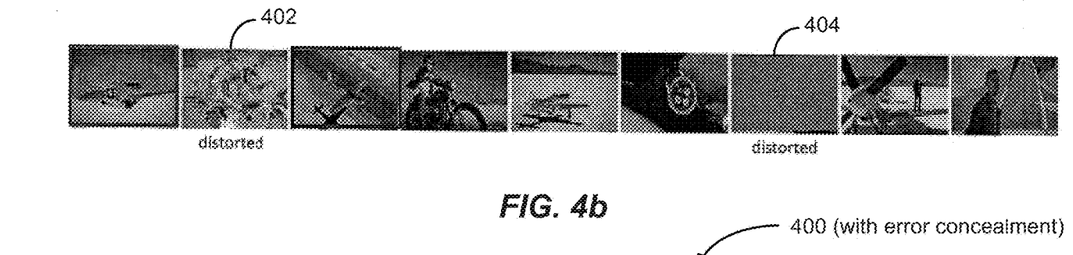
FIG. 4b illustrates the video frames decoded from the video bitstream of FIG. 4a with packet loss.
Figure 4C:
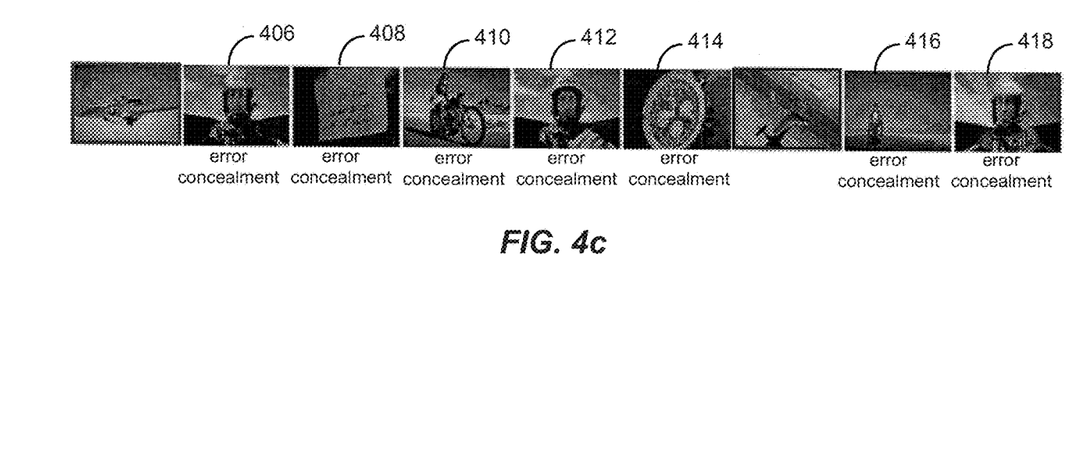
FIG. 4c illustrates the video frames decoded from the video bitstream of FIG. 4a with packet loss, by an exemplary video decoder having the application-assisted error concealment component of FIG. 1.

Representative results derived from using the disclosed application-assisted approach to adaptive spatio-temporal error concealment in video decoders are presented herein with reference to Tables I and II, as well as FIGS. 4a-4c. As demonstrated by such representative results, the disclosed application-assisted approach to adaptive spatio-temporal error concealment can improve a user's quality of experience (QoE) while engaging in real-time video communications, with little or no degradation in performance and/or memory usage.

Table I provides a performance comparison between a typical approach to error concealment and the disclosed application-assisted approach to adaptive spatio-temporal error concealment for several different packet loss ratios (e.g., 0%, 5%, and 10%).

TABLE I

Performance Comparison

| | | Decoder Accumulated Cycle Count | | |
| --- | --- | --- | --- | --- |
| Resolution, Entropy coding | Packet Loss (%) | Typical approach to error concealment | Disclosed approach to error concealment | Overall Performance Difference (%) |
| 640 × 360, CAVLC | 0 | 2886213822 | 2856932425 | −1.01 |
| 640 × 360, CAVLC | 5 | 3172274708 | 2963493689 | −6.58 |
| 640 × 360, CAVLC | 10 | 3637827309 | 3050701699 | −16.13 |

As shown in Table I, for the representative results presented herein, the decoder accumulated cycle count decreases as the packet loss percentage increases (i.e., no degradation in performance is observed), using the disclosed application-assisted approach to adaptive spatio-temporal error concealment.

Table II provides a memory usage comparison between a typical approach to error concealment and the disclosed application-assisted approach to adaptive spatio-temporal error concealment.

TABLE II

Memory Usage Comparison

| Resolution, Entropy coding | Typical approach to error concealment (Bytes) | Disclosed approach to error concealment (Bytes) | Overall Memory Usage Difference (%) |
|---|---|---|---|
| 640 × 360, CAVLC | 1,524,876 | 1,535,916 | 0.72 |

As shown in Table II, for the representative results presented herein, little degradation in memory usage is observed using the disclosed application-assisted approach to adaptive spatio-temporal error concealment.

FIG. 4a depicts a plurality of exemplary video frames 400 decoded from RTP video packets without packet loss, and FIG. 4b depicts the same plurality of exemplary video frames 400 decoded from RTP video packets with a predetermined percentage of packet loss. As shown in FIG. 4b, the plurality of video frames 400 decoded from the RTP video packets with the predetermined percentage of packet loss includes several distorted video frames, such as video frames 402, 404. FIG. 4c depicts the same plurality of video frames 400 decoded from the RTP video packets with the predetermined percentage of packet loss, after having undergone the disclosed application-assisted approach to adaptive spatio-temporal error concealment. As shown in FIG. 4c, distorted video frames (such as the video frames 402, 404; see FIG. 4b) are eliminated, and several video frames (such as video frames 406, 408, 410, 412, 414, 416, 418; see FIG. 4c), previously missing from the plurality of video frames 400 depicted in FIG. 4b, are reestablished in the plurality of video frames 400 depicted in FIG. 4c after having undergone error concealment.

Figure 5:
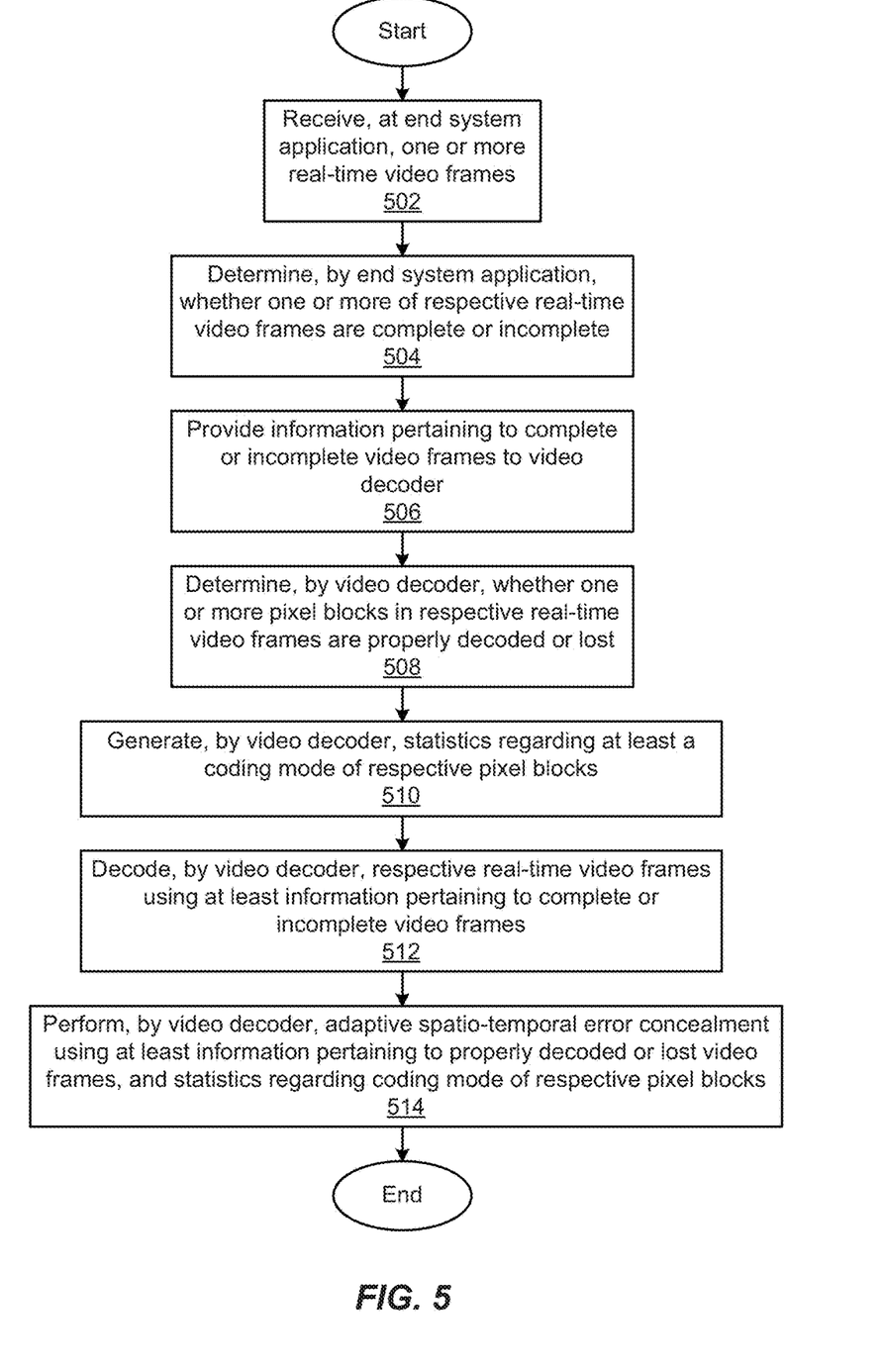
FIG. 5 is a method of performing application-assisted error concealment by the exemplary video decoder having the application-assisted error concealment component of FIG. 1.

A method of performing application-assisted error concealment by a video decoder having an application-assisted error concealment component is described herein with reference to FIG. 5. As depicted in block 502, one or more real-time video frames are received at an end system application within the video decoder. As depicted in block 504, a determination is made, by the end system application, as to whether one or more of the respective real-time video frames are complete or incomplete. As depicted in block 506, information is provided, by the end system application to the video decoder, pertaining to the complete or incomplete video frames. As depicted in block 508, a determination is made, by the video decoder, as to whether one or more pixel blocks within the respective real-time video frames are properly decoded or lost (i.e., missing). As depicted in block 510, statistics regarding at least a coding mode of the respective pixel blocks are generated by the video decoder. As depicted in block 512, the respective real-time video frames are decoded, by the video decoder, using at least the information pertaining to the complete or incomplete video frames. As depicted in block 514, adaptive spatio-temporal error concealment is performed, by the video decoder, using at least the information pertaining to the properly decoded or lost (i.e., missing) pixel blocks, and the statistics regarding the coding mode of the respective pixel blocks.

Having described the above illustrative embodiments, other alternative embodiments are possible, and/or variations to these illustrative embodiments may be made. For example, in the event of an increase in the packet loss rate, the application-assisted error concealment component 112 (see FIG. 1) can temporarily discontinue (e.g., freeze) the processing of the plurality of video frames decoded from the RTP video packets, provide at least one previously decoded video frame of good quality to the user, and subsequently resume the processing of the respective video frames after the packet loss rate has sufficiently decreased. When making the determination as to whether to freeze or resume the processing of the plurality of video frames, the application-assisted error concealment component 112 can generate a map of MB quality scores, and update the map of MB quality scores each time the video decoder 110 decodes a respective video frame. For example, such MB quality scores can range from 0 (representing the worse video quality) to 10 (representing the best video quality), or any other suitable range.

An exemplary method of updating a map of MB quality scores, which can be performed by the application-assisted error concealment component 112, is described herein with reference to the following pseudo-code example:

```
if (decoded MB)
{
    if (intra-coded MB)
    {
        Check quality score(s) of one or more MBs that have been used in the
        processing of the intra-coded MB. If more than one such MB are available, then
        the MB quality score is an average of the quality scores for the available MBs. If
        no such MBs are available, then the MB quality score is set to 10.
    }
    else if (inter-coded MB)
    {
        If all neighboring MBs (e.g., the neighboring MBs relatively located to the left, top,
        right, and bottom of the decoded MB) are available, then the MB quality score is
        the average (also referred to herein as the "AverageScore") of four times the
        quality score of a co-located MB, plus the quality scores of the available
        neighboring MBs. If no such neighboring MBs are available, then the MB quality
        score is equal to the quality score of the co-located MB. Such a co-located MB
        can be in the same position as the decoded MB, but in a different video frame. It
        is noted that a greater weight can be given to such a co-located MB.
    }
}
else
{
    if (decoded MB has undergone spatial error concealment)
    {
        Check quality scores of up to two neighboring MBs (e.g., the two neighboring
```

```
    MBs relatively located to the left, top, right, and/or bottom of the decoded MB)
    having a lower error concealment order than the decoded MB. If there are at
    least two such available neighboring MBs, then the MB quality score is the
    AverageScore minus 2. If there is one such available neighboring MB, then the
    MB quality score is the quality score of the neighboring MB minus 2. If no such
    neighboring MBs are available, then the MB quality score is set to zero.
  }
  else if (decoded MB has undergone temporal error concealment)
  {
    If all neighboring MBs (e.g., the neighboring MBs relatively located to the left, top,
    right, and bottom of the decoded MB) are available, then the MB quality score is
    the AverageScore. If no such neighboring MBs are available, then the MB
    quality score is the quality score of the co-located MB.
  }
  else if (decoded MB has undergone zero MV-based temporal error concealment)
  {
      MB quality score = AverageScore minus 4;
    else
      MB quality score = AverageScore minus 6;
  }
}
```

It is noted that the application-assisted error concealment component 112 can determine when to freeze and when to resume the processing of the respective video frames by counting the number of good quality MBs (e.g., MBs having quality scores greater than zero) in the MB quality map. If the percentage of such good quality MBs is greater than a first specified threshold value, $Thr_{resume}$, then the application-assisted error concealment component 112 can resume the processing of the respective video frames. Otherwise, if the percentage of good quality MBs is less than a second specified threshold value, $Thr_{freeze}$, then the video decoder 110 can discontinue the processing of the respective video frames. For example, the first and second threshold values, $Thr_{resume}$ and $Thr_{freeze}$, can be set to 80% and 50%, respectively, or any other suitable percentage values.

It will be apparent that one or more embodiments described herein may be implemented in many different forms of software and/or hardware. For example, one or more embodiments described herein may include suitable configurations of one or more computerized devices, hardware processors, and/or the like to carry out and/or support any or all of the systems and/or methods described herein. Further, one or more computers, computerized devices, microprocessors, digital signal processors, microcontrollers, random access memories (RAM), read only memories (ROM), data storage devices, etc., may be programmed and/or configured to implement the systems and/or methods described herein.

It will be appreciated by those of ordinary skill in the art that further modifications to and variations of the above-described systems and methods may be made without departing from the inventive concepts disclosed herein. Accordingly, the disclosed invention should not be viewed as limited except as by the scope and spirit of the appended claims.

What is claimed is:

1. A method of application-assisted error concealment in a video receiver, the video receiver including an end system application and a video decoder, the video decoder having an application-assisted error concealment component, comprising:

receiving, at the video receiver over a packet communications network, a plurality of real-time video frames, each of the plurality of real-time video frames including a plurality of slices, each of the plurality of slices including a plurality of real-time video packets, and each of the plurality of real-time video packets including a plurality of pixel blocks;

obtaining, by the end system application, first predetermined information as to (1) whether each respective real-time video frame in the plurality of real-time video frames is complete or incomplete, (2) whether each respective slice in the plurality of slices in the respective real-time video frame is complete, incomplete, or missing, (3) whether at least one of the plurality of real-time video packets in the respective slice is missing, and (4) in the event at least one of the plurality of real-time video packets is missing, whether at least one of the plurality of real-time video packets remaining in the respective slice requires information from the at least one missing real-time video packet for proper decoding;

decoding, by the video decoder, the plurality of real-time video frames including the plurality of pixel blocks included in the plurality of real-time video packets using at least the first predetermined information;

determining, by the video decoder, whether the plurality of pixel blocks are properly decoded or improperly decoded;

obtaining, by the application-assisted error concealment component, a list of pixel blocks eligible for error concealment, the list of pixel blocks including indications of one or more improperly decoded or missing pixel blocks; and for each respective pixel block in the list of pixel blocks:
  obtaining, by the application-assisted error concealment component, second predetermined information pertaining to one or more neighboring pixel blocks, the second predetermined information including indications of (1) an availability of the respective neighboring pixel blocks, (2) in the event at least one neighboring pixel block is available, a coding mode of the at least one neighboring pixel block, and (3) in the event the at least one neighboring pixel block has already undergone error concealment, a mode of error concealment employed on the at least one neighboring pixel block;
  evaluating, by the application-assisted error concealment component using at least the second predetermined information, a plurality of modes of error concealment for possible use on the respective pixel block to obtain an evaluation result; and performing, by the application-assisted error concealment component, one of the plurality of modes of error concealment on the respective pixel block based on the evaluation result.

2. The method of claim 1 wherein the decoding of the plurality of real-time video frames using at least the first predetermined information includes, in the event at least one real-time video packet in the respective slice is missing, discontinuing, at least temporarily, decoding a respective real-time video packet remaining in the respective slice before reaching the end of the respective real-time video packet.

3. The method of claim 2 wherein the decoding of the plurality of real-time video frames using at least the first predetermined information further includes, in the event the at least one real-time video packet in the respective slice is missing, discontinuing the decoding of the respective real-time video packet before reaching a predetermined amount of offset from the end of the respective real-time video packet.

4. The method of claim 1 wherein the plurality of modes of error concealment include a zero motion vector-based temporal mode of error concealment, and wherein the method further comprises:

in the event a boundary pixel error for the zero motion vector-based temporal mode of error concealment is less than a predetermined threshold value, $Thr_{zero\_MV}$, performing, by the application-assisted error concealment component, the zero motion vector (MV)-based temporal mode of error concealment on the respective pixel block in the list of pixel blocks.

5. The method of claim 1 wherein the plurality of modes of error concealment include a temporal mode of error concealment using spatial MV, and wherein the method further comprises:

in the event a SAD value for the temporal mode of error concealment using spatial MV is less than an adaptive sum of absolute difference (SAD) threshold value, $Thr_{adaptive}$, performing, by the application-assisted error concealment component, the temporal mode of error concealment using spatial MV on the respective pixel block in the list of pixel blocks.

6. The method of claim 5 wherein the plurality of modes of error concealment further include a temporal mode of error concealment using block matching, and wherein the method further comprises:

in the event a SAD value for the temporal mode of error concealment using block matching is less than $Thr_{adaptive}$, performing, by the application-assisted error concealment component, the temporal mode of error concealment using block matching on the respective pixel block in the list of pixel blocks.

7. The method of claim 6 wherein the plurality of modes of error concealment further include a spatial mode of error concealment, and wherein the method further comprises:

in the event none of the zero motion vector (MV)-based temporal mode of error concealment, the temporal mode of error concealment using spatial MV, and the temporal mode of error concealment using block matching is performed on the respective pixel block, performing, by the application-assisted error concealment component, the spatial mode of error concealment on the respective pixel block in the list of pixel blocks.

8. The method of claim 1 wherein the plurality of modes of error concealment include a spatial mode of error concealment, and wherein the method further comprises:

determining, by the end system application, whether the respective real-time video frame corresponds to a scene change frame; and in the event the respective real-time video frame corresponds to a scene change frame, performing, by the application-assisted error concealment component, the spatial mode of error concealment on the respective pixel block.

9. A video receiver for use in receiving, over a packet communications network, a plurality of real-time video frames, each of the plurality of real-time video frames including a plurality of slices, each of the plurality of slices including a plurality of real-time video packets, and each of the plurality of real-time video packets including a plurality of pixel blocks, the video receiver comprising:

an end system application operative to obtain first predetermined information as to (1) whether each respective real-time video frame in the plurality of real-time video frames is complete or incomplete, (2) whether each respective slice in the plurality of slices in the respective real-time video frame is complete, incomplete, or missing, (3) whether at least one of the plurality of real-time video packets in the respective slice is missing, and (4) in the event at least one of the plurality of real-time video packets is missing, whether at least one of the real-time video packets remaining in the respective slice requires information from the at least one missing real-time video packet for proper decoding;

a video decoder operative:

to decode the plurality of real-time video frames including the plurality of pixel blocks included in the plurality of real-time video packets using at least the first predetermined information; and to determine whether the plurality of pixel blocks are properly decoded or improperly decoded; and an application-assisted error concealment component operative:

to obtain a list of pixel blocks eligible for error concealment, the list of pixel blocks including indications of one or more improperly decoded or missing pixel blocks; and for each respective pixel block in the list of pixel blocks:

to obtain second predetermined information pertaining to one or more neighboring pixel blocks, the second predetermined information including indications of (1) an availability of the respective neighboring pixel blocks, (2) in the event at least one neighboring pixel block is available, a coding mode of the at least one neighboring pixel block, and (3) in the event the at least one neighboring pixel block has already undergone error concealment, a mode of error concealment employed on the at least one neighboring pixel block;

using at least the second predetermined information, to evaluate a plurality of modes of error concealment for possible use on the respective pixel block to obtain an evaluation result; and to perform one of the plurality of modes of error concealment on the respective pixel block based on the evaluation result.

10. A system for application-assisted error concealment in real-time communications, the system comprising:

a video transmitter operative to send a plurality of real-time video frames over a packet communications network, each of the plurality of real-time video frames including a plurality of slices, each of the plurality of slices including a plurality of real-time video packets, and each of the plurality of real-time video packets including a plurality of pixel blocks; and a video receiver operative to receive the plurality of real-time video frames sent over the packet communications network, the video receiver including:

an end system application operative to obtain first predetermined information as to (1) whether each respective real-time video frame in the plurality of real-time video frames is complete or incomplete, (2) whether each respective slice in the plurality of slices in the respective real-time video frame is complete, incomplete, or missing, (3) whether at least one of the plurality of real-time video packets in the respective slice is missing, and (4) in the event at least one of the plurality of real-time video packets is missing, whether at least one of the real-time video packets remaining in the respective slice requires information from the at least one missing real-time video packet for proper decoding;

a video decoder operative:
  to decode the plurality of real-time video frames including the plurality of pixel blocks included in the plurality of real-time video packets using at least the first predetermined information; and
  to determine whether the plurality of pixel blocks are properly decoded or improperly decoded; and an application-assisted error concealment component operative:
  to obtain a list of pixel blocks eligible for error concealment, the list of pixel blocks including indications of one or more improperly decoded or missing pixel blocks; and
  for each respective pixel block in the list of pixel blocks:
    to obtain second predetermined information pertaining to one or more neighboring pixel blocks, the second predetermined information including indications of (1) an availability of the respective neighboring pixel blocks, (2) in the event at least one neighboring pixel block is available, a coding mode of the at least one neighboring pixel block, and (3) in the event the at least one neighboring pixel block has already undergone error concealment, a mode of error concealment employed on the at least one neighboring pixel block;
    using at least the second predetermined information, to evaluate a plurality of modes of error concealment for possible use on the respective pixel block to obtain an evaluation result; and
    to perform one of the plurality of modes of error concealment on the respective pixel block based on the evaluation result.

11. The system of claim 10 wherein the plurality of real-time video packets include a plurality of real-time transport protocol (RTP) video packets, and wherein the plurality of real-time video frames conform to the H.264 Advanced Video Coding (AVC) video format.

* * * * *